(12) United States Patent
Willets et al.

(10) Patent No.: US 7,566,989 B2
(45) Date of Patent: Jul. 28, 2009

(54) BACK-UP POWER SYSTEM FOR A COOLING SYSTEM

(75) Inventors: Julie Willets, Overland Park, KS (US); Gerald D. Meyers, Olathe, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 343 days.

(21) Appl. No.: 11/302,303

(22) Filed: Dec. 13, 2005

(65) Prior Publication Data

US 2007/0132317 A1 Jun. 14, 2007

(51) Int. Cl.
*H02J 7/00* (2006.01)
*H02J 9/00* (2006.01)

(52) U.S. Cl. .................................................. 307/64
(58) Field of Classification Search ............. 307/64–66, 307/44–45, 56, 86
See application file for complete search history.

(56) References Cited

U.S. PATENT DOCUMENTS

| | | | |
|---|---|---|---|
| 2,958,482 A | 11/1960 | Summers | |
| 3,336,162 A | 8/1967 | Zachman | |
| 5,737,202 A | 4/1998 | Shimamori | |
| 5,760,488 A | 6/1998 | Sonntag | |
| 5,929,538 A | 7/1999 | O'Sullivan et al. | |
| 6,011,324 A | 1/2000 | Kohlstruck et al. | |
| 6,184,593 B1 | 2/2001 | Jungreis | |
| 6,380,637 B1 | 4/2002 | Hsu et al. | |
| 6,452,289 B1 | 9/2002 | Lansberry et al. | |
| 6,492,047 B1 | 12/2002 | Peled et al. | |
| 6,746,790 B2 * | 6/2004 | Colborn | 429/26 |
| 6,879,052 B1 | 4/2005 | Johnson | |
| 6,885,112 B2 | 4/2005 | Johnson | |
| 2003/0173830 A1 * | 9/2003 | Smith et al. | 307/117 |
| 2004/0094963 A1 | 5/2004 | Johnson | |
| 2004/0095022 A1 | 5/2004 | Johnson | |

FOREIGN PATENT DOCUMENTS

WO WO2002/087742 11/2002

OTHER PUBLICATIONS

Yutaka, Kuwata, "Multifueled Fuel-Cell Energy System for Telecommunications Cogeneration System," Icece Trans. Commun., vol. E1B., No. 11, Nov. 1998.
Noboru Asano, "The Future of Our Fuel Cell Total Energy System," NTT REview, Mar. 1994, vol. 6, pp. 47-53.
"A High-Availability Back-up Source of Energy," J.C. Chigolet, et al., Sep. 27, 1993.

* cited by examiner

Primary Examiner—Albert W. Paladini
Assistant Examiner—Carlos Amaya

(57) ABSTRACT

A power system that serves as a source of dedicated back-up power for a cooling system is disclosed. The power system utilizes a plurality of fuel cells, which produce direct current (DC) power. A conversion device, such as an inverter, is used to convert the DC into alternating current (AC) for powering the cooling system. A transfer switch connects the AC power from the inverter to the cooling system. The position of the transfer switch determines the source of AC power for the cooling system.

20 Claims, 3 Drawing Sheets

BACK-UP POWER SYSTEM FOR A COOLING SYSTEM

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention is a back-up power supply system. More specifically, this invention relates to the field of providing back-up power for a cooling system for telecommunications and data center equipment.

BACKGROUND OF THE INVENTION

Traditionally, commercial power from a utility has been used as the primary source of electrical power for a consuming entity, such as a telecommunications facility. Within such a facility is a wide variety of computing equipment such as switches, servers, routers, and other such devices. These devices, when in use, generate heat. This heat must be dissipated in order to avoid damage and possible malfunction of the computing equipment. As telecommunications equipment has advanced to include substantial amounts of digital equipment, maintaining sufficient climate control has become a greater concern to telecommunication providers, such that disruptions in telecommunication services caused by overheating are minimized.

The most common climate controlling approach utilized in the past has been to cool an entire telecommunications facility with an air conditioning system. Typically, this air conditioning system is powered by an existing alternating current (AC) power source, primarily AC drawn from a utility company.

A schematic diagram showing a typical prior art arrangement is shown in FIG. 1. Referring to the figure, an ordinary prior art system 110 includes an enclosed area, e.g., an entire facility, a room, or group of rooms, which includes a plurality of pieces of equipment 116 which are computing devices that generate heat. AC power is administered through an AC bus 132. To cool these devices and other equipment within a telecommunications facility, a building air conditioner 118 is provided that consumes AC from AC bus 132. Because the computing equipment 116 consumes DC, the AC must be converted to DC using a rectifier 130. The primary source of power to the system is received into bus 132 from an AC utility 114 from outside the facility. Also outside of the facility is a diesel generator 120 which is only active if the AC utility 114 has failed, e.g., in a blackout, or where a power line has been taken out of service. The third and final backup source is a plurality of valve-regulated lead-acid (VRLA) batteries 122 which are included in the DC circuit into which the equipment 116 is incorporated. The VRLA batteries must be stored inside the facility 112 because they cannot endure extreme temperatures.

This AC dependent prior art system has proved disadvantageous in the event both the utility and diesel generator sources of AC are unavailable. The VRLA batteries 122 may provide backup for a limited time, but the facilities air conditioning system cannot draw power from them because it runs on AC. Further, the DC power available from the VRLAs 122 cannot be inverted to power the air conditioning system because the load requirements of the air conditioner are too great.

Prior back-up power systems have been provided for telecommunications wherein only a portion of the back-up power is available for cooling the telecommunications and data devices. In such an arrangement, often times not all devices that require cooling can be cooled, since back-up power is also required for other facility operations.

These issues have caused operators to simply go without air conditioning and hope for the utility or diesel generator to come back on line before the temperature inside the facility reaches a level where the telecommunications and data equipment suffers heat-related damage. After that, if the AC sources are too late, the operator must decide whether to shut down, or endure equipment operational problems.

SUMMARY OF THE INVENTION

The present invention provides a power system that serves as a source of dedicated back-up power for a cooling system. The power system utilizes a plurality of fuel cells, which produce direct current (DC) power. A conversion device (e.g. an inverter) is necessary to convert the DC into alternating current (AC) for the cooling system. Presently cooling systems for such facilities, such as an air conditioner, operate on AC power. A transfer switch connects the AC power from the inverter to the cooling system. The position of the transfer switch determines the source of AC power for the cooling system.

In an embodiment of the present invention, the dedicated back-up power source comprises a source of DC, an inverter coupled to the source of DC, and a transfer switch capable of switching between a primary power source, such as a utility AC, and the back-up power source.

An associated method is directed towards providing a back-up power source for a cooling system and determining availability of power sources and air temperature levels proximate the telecommunications devices.

In another embodiment, a telecommunications site for transmitting communications signals having a dedicated back-up power source for a cooling system is provided. The back-up power source comprises the source of DC, an inverter for converting the DC to AC, and a transfer switch, as previously discussed.

BRIEF DESCRIPTION OF THE DRAWINGS

The present invention is described in detail below with reference to the attached drawing figures, wherein.

DETAILED DESCRIPTION OF THE INVENTION

Figure 1:
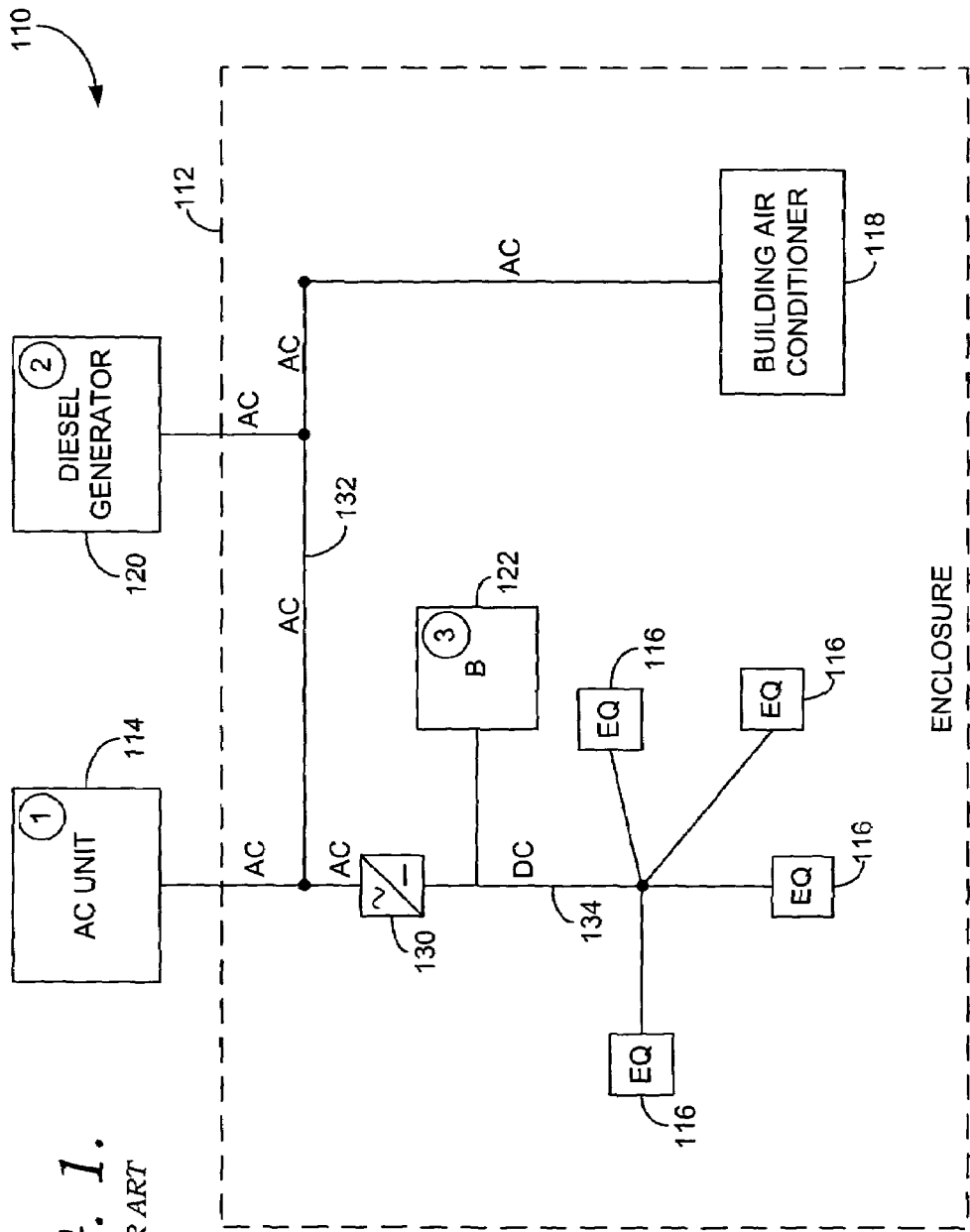
FIG. 1 is a schematic diagram showing a prior art power distribution backup and air conditioning systems used at a telecommunications facility.
Figure 2:
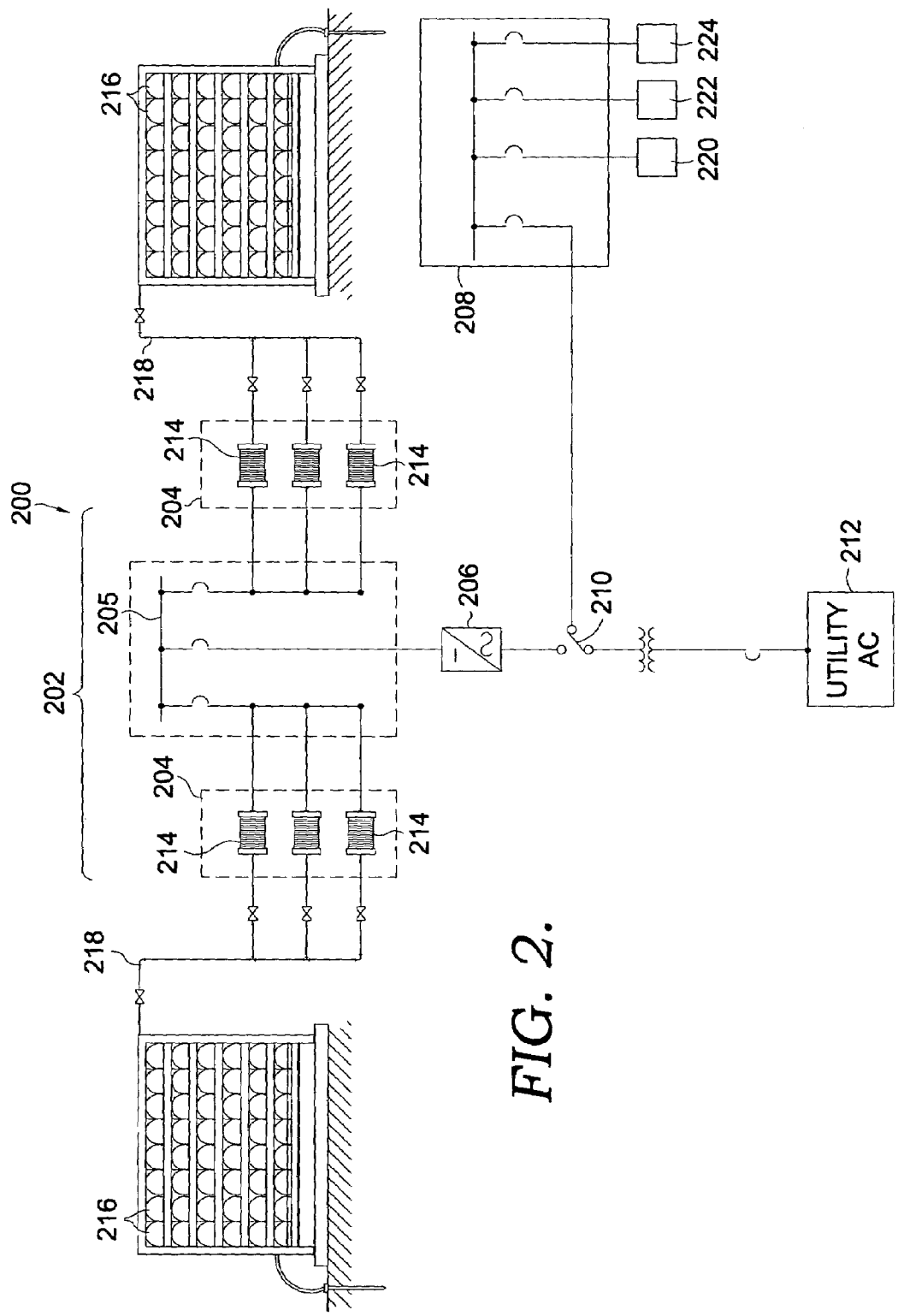
FIG. 2 is a schematic drawing showing a back-up power source and air conditioning system in accordance with an embodiment of the present invention.
Figure 3:
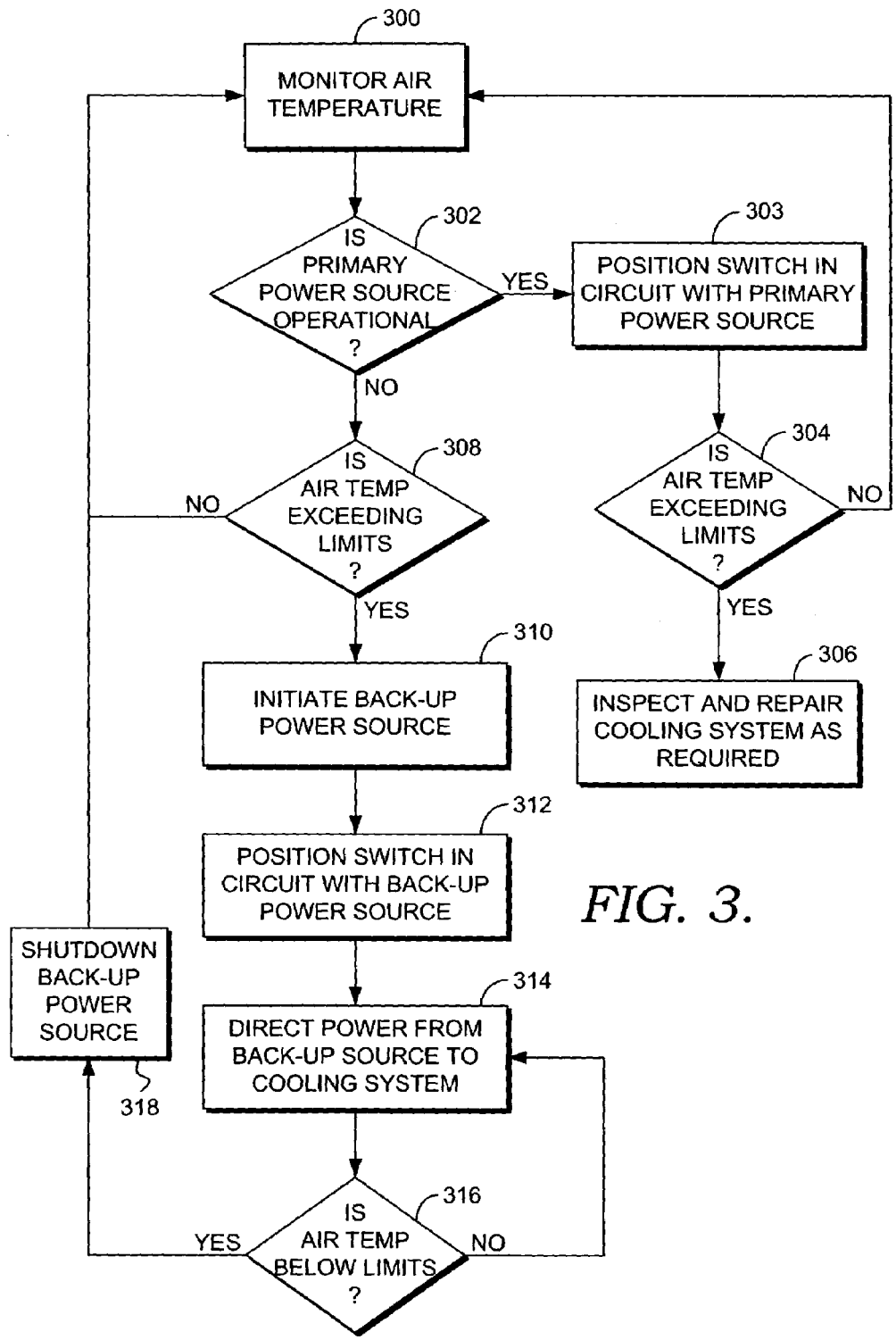
FIG. 3 is a flow diagram showing a method of providing a back-up power source in accordance with the present invention.

The present invention, a back-up power source for a cooling system for a data equipment facility having heat-generating equipment, such as a telecommunications facility, comprises a source of direct current (DC), an inverter to convert all of the DC to alternating (AC), and a transfer switch for directing the AC to the cooling system is shown in detail with (i) the schematic diagrams of FIGS. 1 and 2, and (ii) the flow chart of FIG. 3. Although the design concept is shown and discussed with respect to telecommunications equipment, the invention is applicable to any type of heat-generating equipment present in a data center.

Referring to FIG. 2, a dedicated back-up power source 200 for providing AC to a cooling system is shown in detail. Back-up power source 200 comprises a source of DC 202, which is preferably at least one fuel cell 204, and an inverter 206 that is coupled to source of DC 202 for converting the DC to AC. The DC power generated by fuel cell 204 is provided to a DC bus 205 before passing through inverter 206. The resulting AC powers a cooling system 208, which for the embodiment shown in FIG. 2, comprises a plurality of air conditioners 220, 222, and 224. The back-up power source 200 also comprises a transfer switch 210 capable of switching between a primary power source 212 and back-up power source 200. In FIG. 2, transfer switch 210 is positioned to couple primary power source 212 with cooling system 208. However, when back-up power source 200 is utilized, transfer switch 210 closes a circuit with source of DC 202 and inverter 206 such that all of the resulting AC power from inverter 206 is directed to cooling system 208. Back-up power source 200 is activated when operating temperatures of predetermined telecommunications equipment exceed a predetermined limit and primary power source 212 is unavailable. One such example of telecommunications equipment requiring cooling is a microprocessor-based telecommunications server or router, manufactured by a number of suppliers, such as Sun Microsystems, Hewlett-Packard, and Dell, to name a few, are designed to operate in conditions under 90 degrees Fahrenheit. Extended operation beyond these temperatures can result in performance problems and possible equipment failure.

As previously mentioned, source of DC 202 is preferably a fuel cell 204. Furthermore, fuel cell 204 comprises at least one proton exchange membrane (PEM) 214. Fuel cell 204 is supplied with hydrogen from a plurality of tanks 216 that flows through a conduit 218 before being directed into PEM 214. As one skilled in the art of fuel cell technology will understand, fuel cells are basically electrochemical energy conversion devices. That is, they utilize hydrogen and oxygen to create electricity. Fuel cells have a proton exchange membrane (or other equivalent device) that temporarily remove the electron from hydrogen. Later this hydrogen electron is returned when the hydrogen is combined with oxygen. The reaction is non-combustive and environmentally friendly with the only by products being heat and water, as DC electrical power is produced. Furthermore, as long as hydrogen is available to the fuel cell, DC power can be generated. The fuel cell is not like a battery that discharges over time.

For the embodiment shown in FIG. 2, ninety-six tanks of hydrogen are provided. These tanks supply hydrogen to six 200A PEMs, with each PEM capable of producing 54V of DC. The DC from each PEM is supplied to DC bus 205, which, in turn is coupled to the inverter. Inverter 206, having 60 kVa output, produces the AC required to power the cooling system from the DC generated by the PEMs.

Based on the quantity of equipment requiring cooling at a typical facility, this supply of stored hydrogen will yield up to 24 hours of cooling for the equipment. This time period of cooling can vary depending on the amount of hardware to cool as well as the amount of hydrogen available. Cooling time can be maximized by directing the cooling air to only the telecommunications devices that require cooling as opposed to the entire telecommunications facility. In the embodiment shown in FIG. 2, back-up power is supplied to the telecommunications devices from an alternate source such as a battery, such that no power from back-up power source 200 is required for purposes other than for operating a cooling system for the telecommunications devices. Examples of the types of telecommunications devices that typically require cooling in order to operate within acceptable temperature ranges include, but are not limited to, routers, switching equipment, and other heat generating devices.

An associated method is disclosed that is directed towards providing a back-up power source for a cooling system and determining the availability of the power sources and air temperature levels proximate the telecommunications devices. This method is best understood with reference to the flow diagram shown in FIG. 3. In a step 300 the air temperature proximate the telecommunications equipment is monitored using an industry-standard equipment temperature sensor. In a step 302, a determination is made regarding the availability of primary power source 212, which is typically a utility AC. If the primary power source is operational, then in a step 303, the position of switch 210 is verified to complete a circuit with the primary power source 212. If the switch is not initially in this position, then it is moved to complete this circuit. A determination is made in a step 304 as to whether or not the air temperature proximate the telecommunications equipment exceeds predetermined limits. If the air temperature, as measured by the temperature sensor, is still within predetermined limits, then the process returns to step 300 to continue monitoring the air temperature. If the air temperature exceeds the predetermined limits, and the primary power source 212 is operational and connected to the cooling system through transfer switch 210, then it is understood that any issues regarding sufficient cooling of the telecommunications devices can be attributed to cooling system malfunctions, such as lack of coolant, frozen coils, blocked cooling ducts, etc. The cooling system is inspected and any necessary repairs are made in a step 306.

If, in step 302, the determination is made that primary power source 212 is unavailable, then the determination is made at a step 308 if the air temperature proximate the telecommunications equipment exceeds predetermined limits. For the microprocessor device previously discussed, the upper limit air temperature proximate the device is 90 deg. F. If the air temperature is acceptable and does not exceed this limit, then there is no need to provide cooling powered by the back-up power system to the telecommunications equipment at this time and the process again returns to step 300 for continual temperature monitoring and power source monitoring. If, however, the air temperature proximate the telecommunications equipment does exceed the predetermined limits, then the back-up power source 200 is initiated in a step 310.

Upon successful initiation of the back-up power source, proper positioning of transfer switch 210 is necessary to close a circuit between cooling system 208 and back-up power source 200. This repositioning, as necessary, occurs in a step 312. By default, since the preferred power source is the primary power generated by a utility, the initial position of transfer switch 210 completes a circuit with primary power source 212, as shown in FIG. 2.

Once the circuit between cooling system 208 and back-up power source 200 is closed, power from the back-up source is directed to cooling system 208 in a step 314. In a step 316, a determination is made as to whether or not the air temperature proximate the equipment is now below the predetermined limits. For the example device discussed herein, the air temperature proximate the microprocessor must be below 90 deg.

F. If the air temperature has dropped to under these predetermined limits, such that the equipment has been properly cooled, then back-up power source 200 is shutdown in a step 318 and the process returns to step 300 for continual temperature monitoring and power source monitoring.

Upon continual temperature monitoring, if the primary power source is still unavailable, and the air temperature limits are once again exceeded, the back-up power source is again initiated. However, as can be seen from steps 302 and 303 of FIG. 3, transfer switch 210 is still connected to the back-up power source. Therefore, the transfer switch would not need to be repositioned to form a closed circuit with back-up power source 200 as previously defined in step 312. If the air temperature is still above the upper temperature limits, then the process returns to step 314 where back-up source of DC continues to provide power to the cooling system for continual cooling of the telecommunications equipment.

As previously mentioned, the back-up power source of DC is directed to supply power to a cooling system for telecommunications and data equipment. This arrangement is most commonly used at a telecommunications site that provides transmission of communication signals across a network. A telecommunications site utilizes a primary AC power source for powering the telecommunications equipment as well as serving as the primary power source for the cooling system. While telecommunications sites are known to have redundant back-up systems for powering the communications equipment, such as batteries and other energy storage devices, these back-up systems do not direct dedicated power to back-up the cooling system. The present invention provides a back-up power source comprising a source of DC, an inverter coupled to the source of DC for converting the DC to AC for powering the cooling system and a transfer switch capable of switching between a primary power source and the back-up power source. This arrangement is directed exclusively to the cooling system such that telecommunications equipment can be maintained within predetermined operating limits, even when operating on back-up power.

It will be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A dedicated back-up power source providing alternating current (AC) to a cooling system, the dedicated back-up power source comprising:
    a source of direct current (DC) for supplying the DC to a DC bus;
    the DC bus coupled to the source of DC for passing the DC to an inverter;
    the inverter, coupled to the DC bus, for powering the cooling system by converting said DC to AC;
    a transfer switch capable of switching between the primary power source and the dedicated back-up power source, wherein the transfer switch is initially positioned to couple a primary AC utility to the cooling system, and wherein the transfer switch is alternatively positioned to couple the source of DC exclusively to the cooling system upon reaching the predetermined operating limits, and wherein reaching the predetermined operating limits comprises ascertaining that an operating temperature of telecommunications equipment being cooled by the cooling system is exceeding an acceptable temperature range and ascertaining that the primary AC utility is unavailable.

2. The back-up power source of claim 1, wherein said source of DC is a fuel cell.

3. The back-up power source of claim 2, wherein said fuel cell is supplied with hydrogen.

4. The back-up power source of claim 3, wherein said hydrogen is stored in a plurality of tanks, and wherein said plurality of tanks are sized to provide at least 24 hours of cooling to the telecommunications equipment upon coupling the dedicated back-up power source exclusively to the cooling system.

5. The back-up power source of claim 2, wherein said fuel cell comprises at least one proton exchange member.

6. The back-up power source of claim 1, wherein said source of DC is activated when the operating temperature of the telecommunications equipment exceeds the acceptable temperature range, wherein an upper limit of the acceptable temperature range is based on operating requirements of the telecommunications equipment.

7. The back-up power source of claim 6, wherein said cooling system directs cool air to said telecommunications equipment, as opposed to an entire telecommunications facility, to lower said operating temperatures.

8. The back-up power source of claim 6, wherein said telecommunications equipment comprises routers, switching equipment, and other heat-generating devices.

9. The back-up power source of claim 6, wherein said transfer switch closes a circuit with said source of DC and said inverter when said source of DC is activated.

10. The back-up power source of claim 1, wherein all of said AC from said inverter is directed to power said cooling system.

11. A method of providing a dedicated back-up power source for a cooling system, said method comprising:
    monitoring air temperature proximate to telecommunications equipment, utilizing an equipment temperature sensor, to determine whether the air temperature proximate to the telecommunications equipment exceeds predetermined limits;
    initiating a back-up power source upon determining that predetermined operating limits are reached, wherein the back-up power source is dedicated for exclusively powering the cooling system wherein determining comprises:
        (a) ascertaining that the air temperature proximate to the telecommunications equipment being cooled by the cooling system exceeds a predefined upper limit air temperature; and
        (b) ascertaining that a primary power source for powering said cooling system is unavailable;
    switching said cooling system to said back-up power source; and
    directing power from said back-up power source through an inverter and to said cooling system.

12. The method of claim 11, wherein said back-up source is a fuel cell that generates direct current (DC).

13. The method of claim 12, wherein said fuel cell comprises at least one proton exchange member.

14. The method of claim 12, wherein said fuel cell is supplied with hydrogen from a plurality of storage tanks.

15. The method of claim 11, wherein said step of switching comprises terminating a closed circuit with the primary power source and initiating a closed circuit with said back-up power source, and wherein the method further comprises terminating the closed loop with the back-up power source upon ascertaining that the air temperature proximate to the telecommunications equipment being cooled by the cooling system has dropped below the predefined upper limit air temperature.

16. A site for providing transmission of communication signals across a network, said site having at least a primary AC power source for powering a cooling system and a dedicated back-up power source for said cooling system comprising:
   a utility AC that serves as a primary power source for powering telecommunications equipment and the cooling system, wherein the cooling system directs cooling air to predetermined units of the telecommunications equipment according to cooling requirements;
   a redundant back-up system for providing back-up power to the telecommunications equipment such that no power from the dedicated back-up power supply is used for purposes other than maintaining operation of the cooling system;
   the dedicated back-up power source for exclusively powering the cooling system when predetermined operating limits of the predetermined units are reached, the dedicated back-up power source comprising:
      (a) a source of direct current (DC) for supplying the DC to a DC bus;
      (b) the DC bus coupled to the source of DC for passing the DC to an inverter; and
      (c) the inverter, coupled to the DC bus, for powering the cooling system by converting said DC to AC;
   an equipment temperature sensor capable of continually monitoring air temperature proximate to the telecommunications equipment; and
   a transfer switch capable of switching between the primary power source and the dedicated back-up power source, wherein the transfer switch is initially positioned to couple the primary power source to the cooling system, and wherein the transfer switch is alternatively positioned to exclusively couple the dedicated back-up power source to the cooling system upon reaching the predetermined operating limits, and wherein reaching the predetermined operating limits comprises ascertaining that the air temperature proximate to the telecommunications equipment being cooled by the cooling system exceeds an acceptable temperature range and ascertaining that the utility AC and the redundant back-up system are unavailable.

17. The site of claim 16, further comprising a plurality of heat-generating telecommunications equipment requiring cooling by said cooling system.

18. The site of claim 16, wherein said source of DC is a fuel cell supplied with hydrogen.

19. The site of claim 18, wherein said fuel cell comprises at least one proton exchange member.

20. The site of claim 16, wherein said source of DC is not activated when the air temperature proximate to the telecommunications equipment exceeds the acceptable temperature range but when said primary power source is available.

* * * * *